Feb. 9, 1954
R. DEIBEL
2,668,725
WINDSHIELD WIPER
Filed Dec. 23, 1949
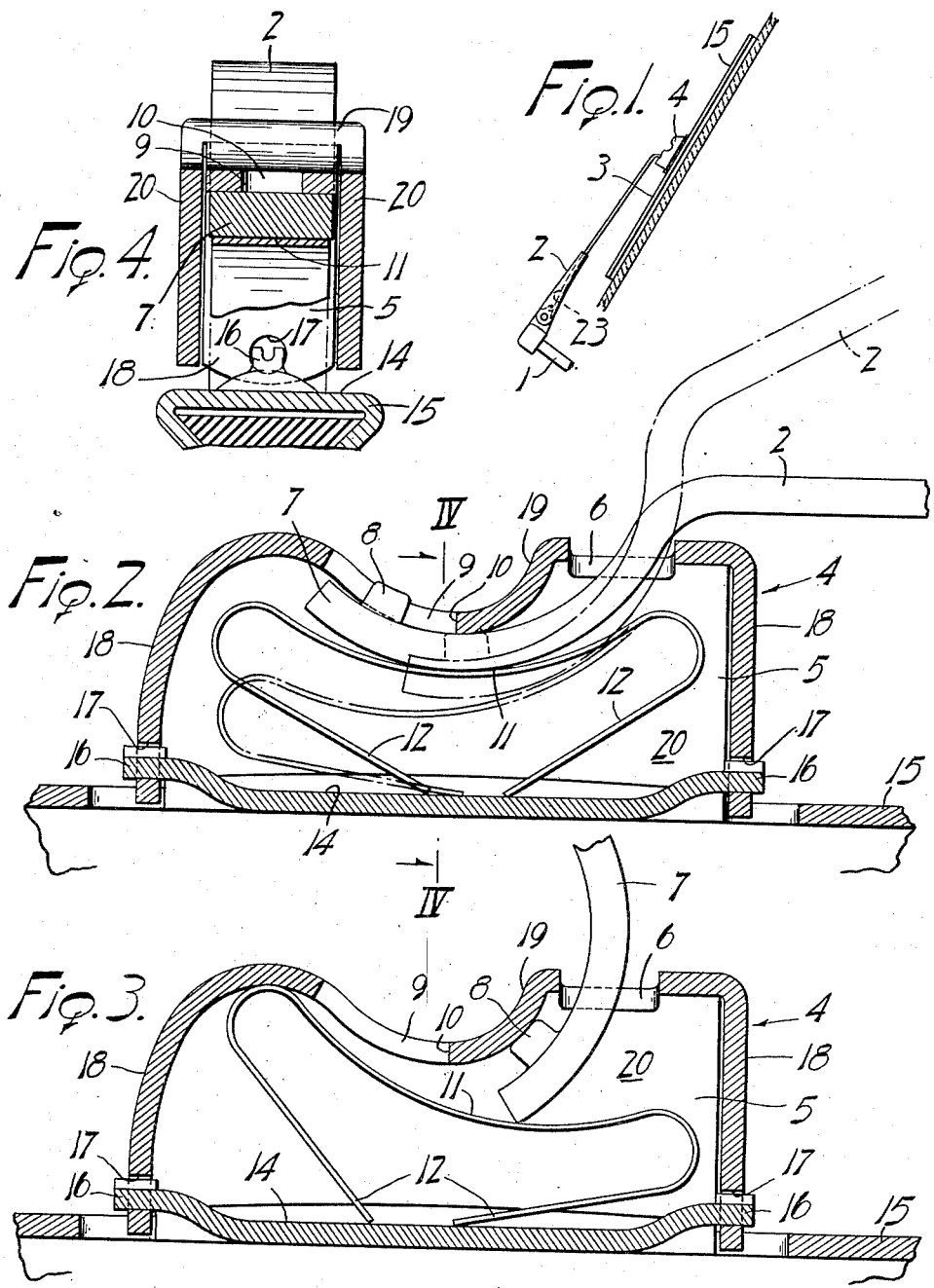
INVENTOR.
Raymond Deibel
BY Bean, Brooks, Buckley & Bean
ATTORNEYS.

Patented Feb. 9, 1954

2,668,725

UNITED STATES PATENT OFFICE 2,668,725

WINDSHIELD WIPER

Raymond Deibel, East Aurora, N. Y., assignor to Trico Products Corporation, Buffalo, N. Y.

Application December 23, 1949, Serial No. 134,811

6 Claims. (Cl. 287—20.5)

This invention relates to certain new and useful improvements in the windshield cleaning art and has particular reference to the connection between the wiper and its actuating arm. In this type of connection which is in widespread use, the wiping blade has an arm coupler or attaching clip which is provided with a chamber into which the free end of the arm is insertible and interlocked with the assistance of a chamber enclosed spring that necessitated a special mounting and therefore involved an item of expense in its manufacture and installation.

The object of the present invention is to provide an economical arm and blade coupler of this character in which the spring mounting is greatly facilitated.

Further, the invention has for its object to provide a wiper arm attachment which is simple and durable in construction and one in which the latch spring is given a freedom of bodily movement that will readily adjust itself to the arm when engaged therewith.

The above and other objects will manifest themselves as the following description progresses, reference being had therein to the accompanying drawing, wherein Fig. 1 is a side elevation depicting a practical application of the invention;

Figs. 2 and 3 are fragmentary longitudinal sections illustrating the spring in action; and Fig. 4 is a transverse sectional view about on line 4—4 of Fig. 2.

Referring more particularly to the drawing, the numeral 1 designates the wiper actuating shaft, 2 its oscillating arm, and 3 the wiper blade which is connected to the outer end of the arm by means of the attaching clip.

The clip or coupling member is in the form of a housing 4 having a chamber 5 with an entranceway 6 through which latter the arcuate terminal 7 of the wiper carrying arm 2 is inserted to engage its keeper lug 8 in a guide slot 9 behind a shoulder 10 normally for obstructing withdrawal of the arm. The lug 8 and shoulder 10 are yieldably supported in cooperative relationship by a spring.

This spring is floatingly disposed within the chamber 5 for free bodily movement and may be shaped from flat spring stock to provide an arcuate arm seat 11 and depending legs 12 for supporting the body or seat portion 11 in its operative position against the convex undersurface of the arcuate end 7. The free ends of the supporting legs 12 are preferably cut square across to cooperate with a flat supporting surface 14 on the back of the wiper blade 3 in normalizing or erecting the latter on the windshield surface during periods of inactivity. The legs 12 converge downwardly to underlie the arm seat 11 and are free to fold under to a greater extent to enable the seat yielding and tilting during placement and displacement of the arm, somewhat as indicated by the dot and dash showing in Fig. 2 and the full line position of Fig. 3. In effect the parts 11 and 12 form a spring frame of a resilient and yieldable character which is loose and rockably mounted within the clip chamber 5 and reacts upon the arm terminal to assume a normal upright position when the wiper is operatively engaged with the arm. The spring frame, being loosely confined within the clip chamber, is quickly assembled without any special mounting, the spring being dropped within the chamber 5 when invented and preliminary to mounting the clip on the blade.

The clip may be attached to the blade either fixedly or pivotally. In the illustrated embodiment the channeled holder 15 of the blade has a pair of oppositely extending pintles 16 struck therefrom, at the opposite ends of the flat back portion 14, for pivoting in bearings 17 in the end walls 18 of the clip.

The clip may be economically stamped from sheet metal and shaped to provide the wiper chamber 5 with the end walls 18, the back wall 19 and the side walls 20. When shaped to form the clip, it is apparent that either end wall 18 may be sprung outwardly to disengage or re-engage the pintles 16 in its bearings 17. The slot 9 and the entranceway 6 are both formed in the back wall 19 which latter is shaped for nesting in the arcuate terminal or tongue 7. The flat back portion 14 constitutes a bottom wall for the chamber 5.

In operation, when the tongue is inserted through the entranceway 6, it initially depresses and rocks the spring frame, as shown in Fig. 3, and as the lug 8 is slid along the convex back wall surface into the slot 9 it will cause the spring frame to assume an upright position within the chamber to hold the tongue nested on the back wall as well as in the seat. For removing the wiper from the arm, the free end of the latter is depressed within the chamber to disengage the lug 8 and thereafter it is withdrawn as shown by the broken lines of Fig. 2.

The clip and its spring are readily assembled with respect to each other and on the back of the wiping blade. The construction is economical and practical, and while the description has been

What is claimed is:

1. A wiper having a flat back portion, an elongate coupling member secured to said back portion longitudinally thereof and formed with a chamber opening toward the back portion, said member having a longitudinally extending arcuate top wall portion opposite said back portion and an arm receiving entrance opening at one end of said wall portion, an arm-interlocking shoulder in said arcuate wall portion extending transversely thereof and a spring transversely flat in cross section and loosely confined in said chamber, said spring having an arcuate arm seat portion nesting with said arcuate wall portion and square ended supporting leg portions, said leg portions being continuous with said seat portion at the ends thereof and turned thereunder with their ends bearing on said back portion in downwardly converging proximity with each other.

2. A wiper having a coupling chamber provided with a convex back wall and an opposing bottom wall, the back wall having an arm interlocking shoulder and the chamber having an arm receiving opening, and a terminal depressible spring loosely confined within the chamber and having an arcuate terminal-receiving seat nestingly related to the convex back wall and having a medial underlying resilient portion rockable upon the bottom wall and yieldable to tilt the seat from the back wall for introducing an arm terminal.

3. A windshield wiper having an arm coupling part, said coupling part comprising a housing having a chamber with a convex back wall and an opposing bottom wall, the back wall having a shoulder and the chamber having an opening through which an arm terminal may be inserted to interlockingly engage such terminal over the shoulder, and a terminal-receiving seat having resilient end portions angularly extended under the medial portion of the seat and resiliently bearing on the bottom wall to rockably support the seat.

4. A windshield wiper having a coupling part, said coupling part comprising a housing having a chamber with a convex back wall and an opposing bottom wall, the back wall having a shoulder and the chamber having an opening through which an arm terminal may be inserted to interlockingly engage such terminal over the shoulder, and a terminal-receiving seat having resilient end portions angularly extended under the medial portion of the seat and resiliently bearing on the bottom wall to rockably support the seat, said seat being concave lengthwise and loosely nesting with respect to the back wall to limit the rocking of the seat.

5. A windshield wiper coupling comprising a chambered housing provided with a bottom wall and a back wall having a shoulder, said chamber having an arm receiving opening, and a terminal-depressible spring arranged within the chamber and having a medial terminal-receiving seat portion with underlying resilient legs extending convergently from adjacent the opposite ends of the seat portion, the free ends of the legs slidably resting upon the bottom wall to enable one end of the seat portion to be rocked away from the back wall, such end of the seat portion being exposed through the arm receiving opening to an entering terminal for engagement thereby to so rock the seat portion in facilitating the interlocking engagement.

6. A windshield wiper having a coupling housing for receiving the curved terminal of an actuating arm, said housing having a chamber with a back wall and an opposing bottom wall, the back wall having an arm engaging shoulder and the chamber having an arm receiving opening, and a terminal-depressible spring substantially triangular in shape having one side opposing the back wall to hold an inserted terminal interlocked with the shoulder and its opposite apex rockably engaging the bottom wall to enable the one side being tilted from the back wall for easing the insertion and interlocking of such terminal.

RAYMOND DEIBEL.

References Cited in the file of this patent

UNITED STATES PATENTS

| Number | Name | Date |
|---|---|---|
| 1,242,441 | Hills | Oct. 9, 1917 |
| 1,407,118 | Bennett | Feb. 21, 1922 |
| 1,745,033 | Smith | Jan. 28, 1930 |
| 2,065,817 | Marien | Dec. 29, 1936 |
| 2,244,624 | Kanter | June 3, 1941 |
| 2,332,765 | Thiele | Oct. 26, 1943 |